L. Fay,
Nut Lock.

No. 112,574.        Patented Mar. 14, 1871.

Witnesses
A. Greene
D. Brown

Lyman Fay, Inv.
by his Attorney,
James G. Arnold

United States Patent Office.

LYMAN FAY, OF WORCESTER, MASSACHUSETTS.

Letters Patent No. 112,574, dated March 14, 1871.

IMPROVEMENT IN NUT-LOCKS.

The Schedule referred to in these Letters Patent and making part of the same.

I, LYMAN FAY, of the city and county of Worcester, State of Massachusetts, have invented an Improved Nut-Lock, of which the following is a specification.

My invention relates to securing the nuts of bolts which are liable to become loose and unscrew by jarring or wear, more especially those used on railroad-rails, and for similar purposes.

Its object is to make a secure, reliable lock, that shall not wear or jar loose or out of place.

Its nature consists in using a washer with an eye or socket, and a locking-cap, having flanges to embrace the eye or socket, with holes for a peculiar locking-pin, the cap having an elastic lining or packing between it and the washer, and is made of such shape that when pinned to the washer it is impossible for the nut to turn; the pin being made round, with a head or an eye to remove it, and a part of it corresponding to the eye of the washer cut away to a curve eccentric to the body of the pin, thus forming a lock by the packing, when the pin is in one position, and when it is turned half round it may be extracted or inserted.

Figure 1:
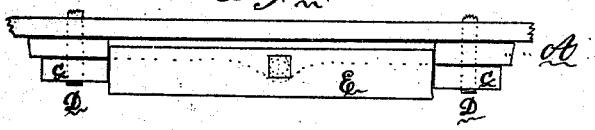
Figure 1 shows a portion of a railroad-rail with two bolts and nuts, to which my invention is applied.
Figure 2:
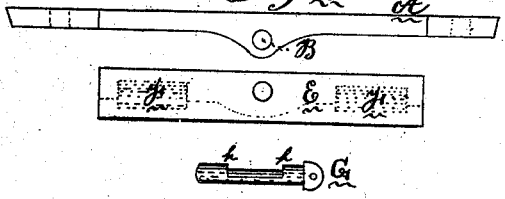
Figure 2 shows the washer, cap, and pin separated.
Figure 3:
Figure 3 shows a section of the pin on a larger scale.

General Description.

A is the washer, with its eye B.

C C are the nuts on the bolts D D.

E is the cap with its elastic packing F F, and its end fitting against the nuts when in place.

G is the pin, of which

H is a cross-section, showing the part cut away between $h\ h$.

The washer being put on the bolts, and the nuts screwed on tight, as wanted, and left with a flat side toward the eye, the cap is put on and the packing compressed so as to admit the pin, which is inserted and turned so that the eye B falls into the notch $h\ h$, thus locking the pin in place, and from whence it can only be withdrawn by compressing the packing, either by turning the pin half round or some other means, to make the holes coincide, so that the pin can be withdrawn; the packing being made sufficiently strong to hold the pin in place, so that it cannot wear or jar loose, and the whole securely holds the nuts from turning except when released.

I claim—

The eye-formed washer, in combination with the holding-cap, having an elastic packing between it and the washer, and an eccentric-locking pin, substantially as described.

LYMAN FAY.

Witnesses:
A. GREENE,
D. BROWN.